US012803355B2

(12) United States Patent
Yazaki et al.

(10) Patent No.: US 12,803,355 B2
(45) Date of Patent: Nov. 17, 2026

(54) COOLING WITH OUTER AND INNER SHAFT STRUCTURE IN ROTATING ELECTRIC MACHINE

(71) Applicant: HONDA MOTOR CO., LTD., Tokyo (JP)

(72) Inventors: Manabu Yazaki, Wako (JP); Kenichi Senda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 18/613,974

(22) Filed: Mar. 22, 2024

(65) Prior Publication Data

US 2024/0333055 A1 Oct. 3, 2024

(30) Foreign Application Priority Data

Mar. 28, 2023 (JP) ................................ 2023-050704

(51) Int. Cl.
*H02K 1/32* (2006.01)
*H02K 1/30* (2006.01)
*H02K 9/193* (2006.01)
*H02K 21/14* (2006.01)

(52) U.S. Cl.
CPC ................. *H02K 1/32* (2013.01); *H02K 1/30* (2013.01); *H02K 9/193* (2013.01); *H02K 21/14* (2013.01)

(58) Field of Classification Search
CPC ............ H02K 1/32; H02K 1/30; H02K 9/193; H02K 21/14; H02K 1/27; H02K 7/003; H02K 9/19; F16C 3/023
See application file for complete search history.

(56) References Cited

U.S. PATENT DOCUMENTS

2005/0156471 A1 7/2005 Kobayashi et al.
2015/0288255 A1 10/2015 Barker et al.
2016/0013704 A1 1/2016 Wagner et al.
(Continued)

FOREIGN PATENT DOCUMENTS

DE 10 2016 215 423 A1 2/2018
EP 3965266 A1 3/2022
(Continued)

OTHER PUBLICATIONS

Extended European Search Report dated Sep. 13, 2024 issued in corresponding European application No. 24167219.5; English text (11 pages).

(Continued)

*Primary Examiner* — Christopher M Koehler
*Assistant Examiner* — Viswanathan Subramanian
(74) *Attorney, Agent, or Firm* — Rankin, Hill & Clark LLP

(57) ABSTRACT

A rotor of a rotating electric machine includes a rotating shaft. A coolant flow path is formed in the rotating shaft. The coolant flow path includes a first flow path and a second flow path. The first flow path extends from one end part of the rotating shaft toward another end part along an axial direction of the rotating shaft. The second flow path extends toward the other end part of the rotating shaft on an outer circumferential side of the first flow path. The coolant flow path further includes a communication flow path. The first flow path and the second flow path communicate with each other via the communication flow path.

9 Claims, 4 Drawing Sheets

(56) References Cited

U.S. PATENT DOCUMENTS

| | | | | |
|---|---|---|---|---|
| 2016/0248303 | A1 | 8/2016 | Kiyokami et al. | |
| 2019/0097482 | A1 | 3/2019 | Huber et al. | |
| 2022/0052578 | A1 | 2/2022 | Cross | |
| 2022/0320945 | A1 | 10/2022 | Yazaki et al. | |
| 2024/0014710 | A1 * | 1/2024 | Rustichelli | H02K 9/197 |

FOREIGN PATENT DOCUMENTS

| | | | |
|---|---|---|---|
| EP | 3 494 629 | B1 | 4/2022 |
| JP | 2005-198451 | A | 7/2005 |
| JP | 2016-174443 | A | 9/2016 |
| JP | 6065805 | B2 | 1/2017 |
| JP | 2022-157784 | A | 10/2022 |
| WO | 2022/049009 | A1 | 3/2022 |

OTHER PUBLICATIONS

Japanese Office Action Corresponding to JP 2023-050704, dated Sep. 1, 2026, 10 pages.

* cited by examiner

COOLING WITH OUTER AND INNER SHAFT STRUCTURE IN ROTATING ELECTRIC MACHINE

CROSS-REFERENCE TO RELATED APPLICATIONS

This application is based upon and claims the benefit of priority from Japanese Patent Application No. 2023-050704 filed on Mar. 28, 2023, the contents of which are incorporated herein by reference.

BACKGROUND OF THE INVENTION

Field of the Invention

The present invention relates to a rotating electric machine including a rotor provided with permanent magnets and a rotating shaft, and a stator surrounding the rotor.

Description of the Related Art

When the rotating electric machine is a generator, an alternating current is generated in electromagnetic coils of the stator, as the rotor rotates in the stator. The electromagnetic coils generate heat by this power generation, and the rotating electric machine becomes high temperature. When the temperature of the rotating electric machine becomes excessively high, the magnetic forces in the rotating electric machine decrease. As a result, the efficiency of the rotating electric machine is reduced. In order to avoid this, as described in JP 2016-174443 A, it is proposed to cool the stator with a cooling oil.

SUMMARY OF THE INVENTION

In order to further remove heat from the rotating electric machine, it is desirable to cool the rotor more efficiently in addition to cooling the stator.

An object of the present invention is to solve the aforementioned problem.

According to one embodiment of the present invention, there is provided a rotating electric machine including a rotor and a stator surrounding the rotor, the rotor including a permanent magnet and a rotating shaft, wherein the rotating shaft includes an outer shaft having a hollow tubular shape, an inner shaft configured to be inserted in an interior of the outer shaft, and a coolant flow path through which a coolant flows, and the coolant flow path includes a first flow path formed in the inner shaft, a second flow path formed in the outer shaft, and a communication flow path configured to place the first flow path and the second flow path in communication with each other.

According to another embodiment of the present invention, there is provided a rotating electric machine including a rotor and a stator surrounding the rotor, the rotor including a permanent magnet and a rotating shaft, wherein the rotating shaft includes a coolant flow path through which a coolant flows, the coolant flow path includes a first flow path extending from one end part toward another end part of the rotating shaft, along an axial direction of the rotating shaft, a second flow path communicating with a terminal end of the first flow path in a flow direction in which the coolant flows, and extending toward the other end part of the rotating shaft on an outer circumferential side of the first flow path, and a communication flow path extending from an inner side toward an outer side of the rotating shaft in a diametrical direction of the rotating shaft and placing the terminal end of the first flow path and the second flow path in communication with each other.

In the present invention, the coolant flow path is provided in the interior of the rotating shaft. The permanent magnet can be efficiently cooled by the coolant flowing through the coolant flow path. In addition, in this configuration, since the coolant flows in the interior of the rotating shaft, any concern that foreign substance may be mixed into the coolant from the outside of the rotating shaft can be dispensed with.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
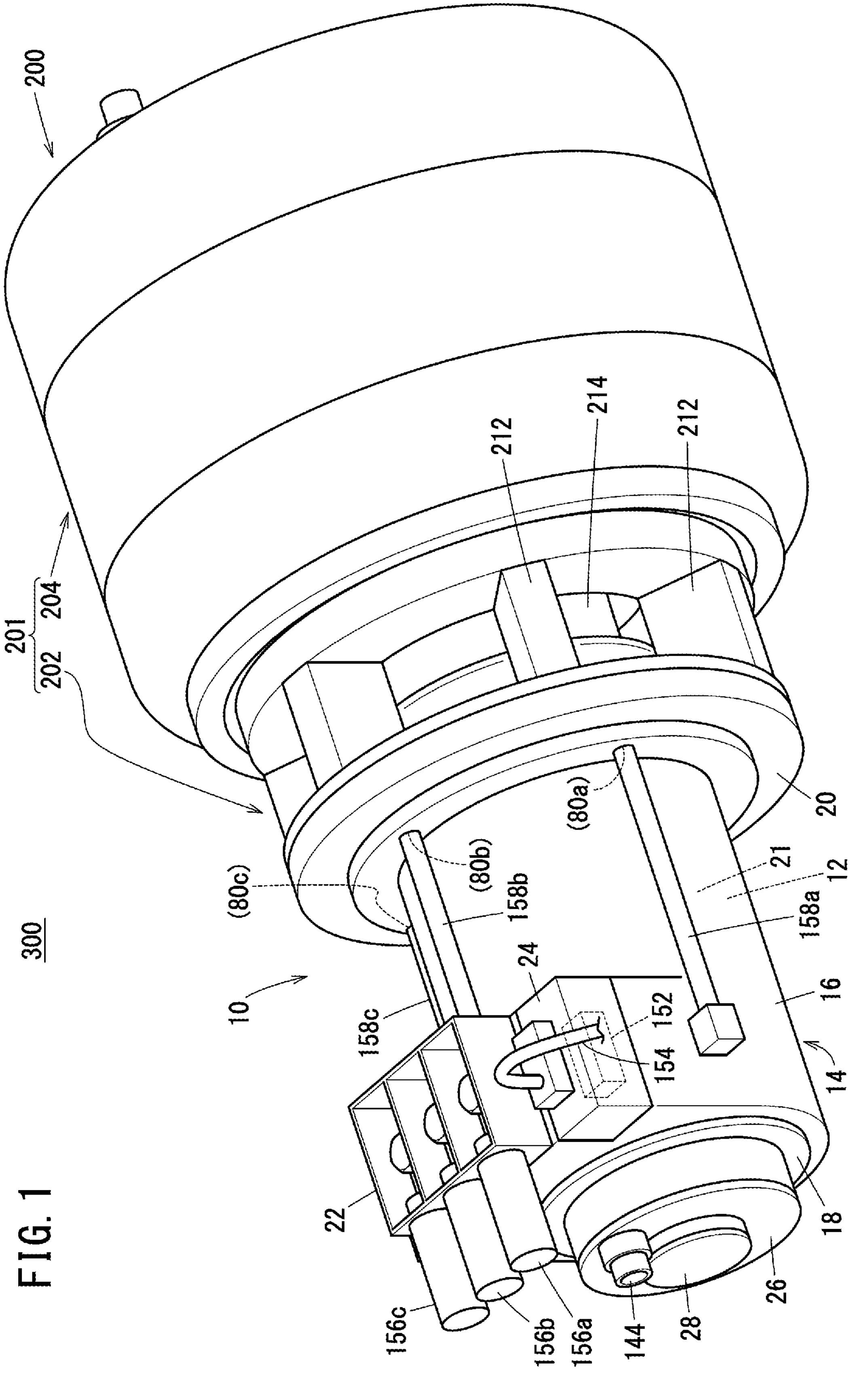
FIG. 1 is a schematic overall perspective view of a combined power system including a rotating electric machine system according to a first embodiment of the present invention.

FIG. 1 is a schematic overall perspective view of a combined power system 300 according to a first embodiment. The combined power system 300 comprises a rotating electric machine system 10 and a gas turbine engine 200, which is an internal combustion engine. The gas turbine engine 200 is disposed on a right side in an axial direction of the rotating electric machine system 10. Further, an axis that extends along a longitudinal direction (axial direction) and passes through a diametrical center of the rotating electric machine system 10, and an axis that extends along a longitudinal direction (axial direction) and passes through a diametrical center of the gas turbine engine 200 coincide with each other. Stated otherwise, the rotating electric machine system 10 and the gas turbine engine 200 are arranged on the same axis.

The combined power system 300 is used, for example, as a power source for providing propulsion in a flying object, a ship, an automobile, or the like. Suitable specific examples of the flying object include drones and multi-copters. The combined power system 300, when mounted on a flying object, is used as a power drive source for rotationally urging, for example, a prop, a ducted fan, or the like. The combined power system 300, when mounted on a ship, is used as a screw rotational force generating device. The combined power system 300, when mounted on an automobile, is used as a power drive source for rotating a motor.

The combined power system 300 can also be used as an auxiliary power source in an aircraft, a ship, a building, or the like. Apart therefrom, it is also possible to utilize the combined power system 300 as gas turbine power generation equipment.

The gas turbine engine 200 is an internal combustion engine. Further, the gas turbine engine 200 serves as a gaseous coolant supply device that supplies compressed air. As will be discussed later, the compressed air flows as a gaseous coolant inside a rotating electric machine housing 14 (housing).

In the following description, the respective terms "left", "right", "lower", and "upper" refer specifically to the left, right, lower and upper directions shown in FIG. 2. However, these directions are provided for the sake of convenience in order to simplify the description and to facilitate understanding. In particular, the directions described in the specification are not limited to the directions when the combined power system 300 is actually used. Hereinafter, left ends in the axial direction of each of the rotating electric machine system 10 and the gas turbine engine 200 may be referred to respectively as first ends or first end parts. Similarly, right ends in the axial direction of each of the rotating electric machine system 10 and the gas turbine engine 200 may be referred to as second ends or second end parts.

In addition, the following shows examples in which a stator 32 is cooled by compressed air. However, it is also possible to divide the interior of the rotating electric machine housing 14 into a rotor chamber and a stator chamber by providing a partition wall member interposed between a rotor 30 and the stator 32 in a diametrical direction of each of rotating electric machines 12 and 13, and to allow oil to flow through the stator chamber. In this case, the stator 32 is cooled by the oil.

Figure 2:
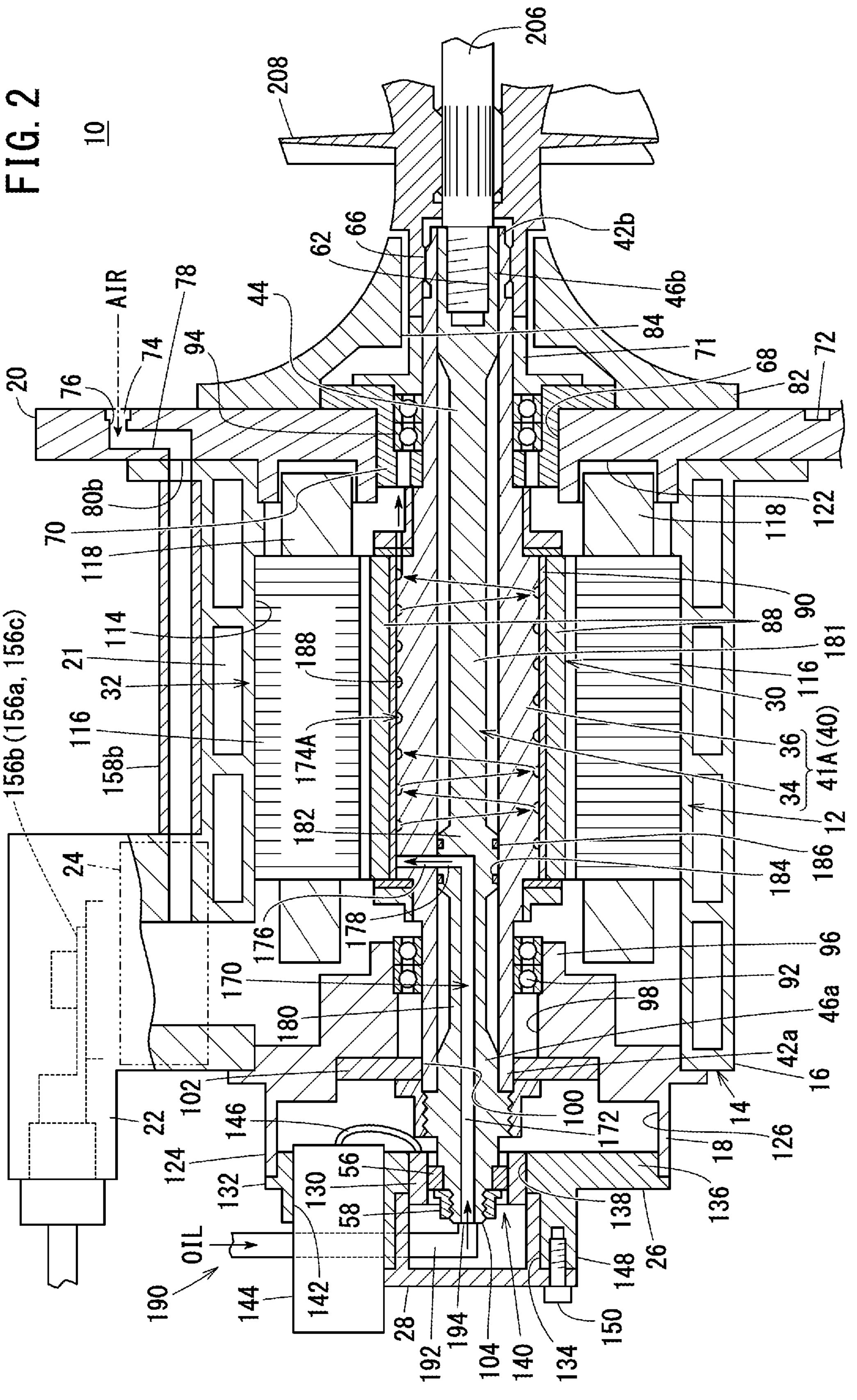
FIG. 2 is a schematic cross-sectional view taken along an axial direction of the rotating electric machine system.

As shown in FIG. 2, the rotating electric machine system 10 includes the rotating electric machine 12 according to the first embodiment. The rotating electric machine 12, for example, is a generator. The rotating electric machine 12 may be a motor.

The rotating electric machine system 10 is equipped with the rotating electric machine housing 14 (housing) that accommodates the rotating electric machine 12. The rotating electric machine housing 14 has a main housing 16 that exhibits a substantially cylindrical shape, and has open ends on both the left and right ends thereof. The rotating electric machine housing 14 further includes a first sub-housing 18 connected to the left end of the main housing 16 and a second sub-housing 20 connected to the right end of the main housing 16.

The main housing 16 has a substantially cylindrical shape in which a thick side wall extends in a left-right direction. A cooling jacket 21 through which a cooling medium (a coolant) flows is formed in the inner portion of the side wall. As a specific example of the coolant, there may be cited cooling water. In this case, the cooling jacket 21 is a water jacket. Further, on an outer circumferential surface of the side wall of the main housing 16, in the vicinity of a left end thereof, a terminal casing 22 and a measuring device casing 24 are disposed integrally with the main housing 16.

Furthermore, on an outer circumferential surface of the side wall of the main housing 16, there are provided hollow pipe members 158*a* to 158*c* (see FIG. 1) that extend along a longitudinal direction (the left-right direction in FIG. 2) of the main housing 16. The hollow interior parts of the hollow pipe members 158*a* to 158*c* are compressed air flow passages through which a curtain air flows. Further, a detector retaining member that retains the rotation parameter detector is connected to the first sub-housing 18. According to the first embodiment, as the rotational parameter detector, a resolver 140 is exemplified. Accordingly, hereinafter, the detector retaining member that is connected to the first sub-housing 18 will be referred to as a "resolver holder 26". A cap cover 28 is screw-engaged with the resolver holder 26.

The rotating electric machine 12 includes the rotor 30, and the stator 32 that surrounds an outer circumferential side of the rotor 30.

The rotor 30 includes a rotating shaft 40. The rotating shaft 40 is a double structure shaft 41A including an inner shaft 34 and an outer shaft 36. The inner shaft 34 is removably inserted in the outer shaft 36 having a hollow tubular shape. Specifically, the outer shaft 36 is a hollow body having a substantially cylindrical shape. Both ends of the outer shaft 36 are open ends. More specifically, the outer shaft 36 has a left open end 42*a* and a right open end 42*b*.

The inner shaft 34 includes a columnar part 44 which is longer in length than the outer shaft 36 and a diameter of which is minimal, a left end part 46*a* which is connected to a left side of the columnar part 44 and a diameter of which is larger in comparison with the columnar part 44, and a right end part 46*b* which is connected to the right side of the columnar part 44 and a diameter of which is larger in comparison with the columnar part 44 and smaller in comparison with the left end part 46*a*. One portion of the left end part 46*a* is an extending portion 104 that protrudes and extends from the left open end 42*a* of the outer shaft 36.

A resolver rotor 56 is attached to the extending portion 104. A small cap nut 58 is screw-engaged with the extending portion 104. The resolver rotor 56 is positioned and fixed to the extending portion 104 by being held between the small cap nut 58 and a large diameter portion of the extending portion 104.

A left end (first end part) of the double structure shaft 41A is rotatably supported by the first sub-housing 18 via a first bearing 92. A right end (second end part) of the double structure shaft 41A is rotatably supported by the second sub-housing 20 via a second bearing 94. The first bearing 92 and the second bearing 94 are lubricated and cooled by, for example, lubricating oil supplied in the form of a jet stream. That is, in this case, the first bearing 92 and the second bearing 94 are so-called jet lubrication type bearings.

The first bearing 92 and the second bearing 94 are not limited to the jet lubrication type bearings. The first bearing 92 and the second bearing 94 may be of a spray lubrication type in which an oil mist is sprayed thereon, or a circulation lubrication type. Lubricated bearings of this type are well known, and accordingly, detailed illustration and description thereof will be omitted.

Specifically, the first sub-housing 18 includes a cylindrical columnar shaped projecting portion 96 that is projected out toward the main housing 16 and that exhibits a substantially cylindrical shape. The columnar shaped projecting portion 96 has a first insertion hole 98. The first bearing 92 is disposed inside the first insertion hole 98.

The second sub-housing 20, which exhibits a substantially disk-like shape, is connected via non-illustrated bolts to the main housing 16. A center of the second sub-housing 20 forms a thick-walled cylindrical portion, and a large-diameter insertion hole 68 is formed in such a cylindrical portion. The second bearing 94 is inserted into the insertion hole 68. The second bearing 94 is sandwiched between an inner stopper 70 and an outer stopper 71, and is positioned and fixed thereby.

In the second sub-housing 20, an annular concave portion 72 is formed in an end surface thereof that faces toward the gas turbine engine 200. The annular concave portion 72 is formed with an annular collection flow path 74. A portion of the compressed air generated by the gas turbine engine 200 is diverted into and flows through the collection flow path 74. Upstream side communication holes 76 are formed at three locations on a bottom wall of the annular concave portion 72.

Relay communication passages 78 shown in FIG. 2 are provided in an interior portion of the second sub-housing 20. The relay communication passages 78 extend radially along a diametrical direction of the second sub-housing 20. The relay communication passages 78 communicate on an outer side in the diametrical direction with the collection flow path 74 via the upstream side communication holes 76. Further, in the second sub-housing 20, three downstream side communication holes 80*a* to 80*c* (see FIG. 1) are formed in an end surface thereof that faces toward the rotating electric machine 12. The downstream side communication holes 80*a* to 80*c* are downstream side openings of the relay communication passages 78. The three downstream side communication holes 80*a* to 80*c* individually communicate with the respective hollow pipe members 158*a* to 158*c*. As can be understood from such a configuration, the relay communication passages 78 place the collection flow path 74 in communication with the hollow interior parts (compressed air flow passages) of the hollow pipe members 158*a* to 158*c*. A distribution passage is formed by the collection flow path 74 and the relay communication passages 78.

In the second sub-housing 20, a rectifying member 82 is connected to the end surface thereof that faces toward the gas turbine engine 200. A second end of the rectifying member 82 protrudes toward the gas turbine engine 200. In the rectifying member 82, a first end facing toward the second sub-housing 20 is formed to have a large-diameter and thin-walled annular shape. In the rectifying member 82, a top portion facing toward the gas turbine engine 200 is formed to have a small-diameter and thick-walled annular shape. Accordingly, the rectifying member 82 has a chevron or mountain shaped body or a bottomless cup shaped body.

A diameter (an opening diameter) of a through hole 84 formed in the top portion is larger than an outer diameter of the outer stopper 71. Therefore, a gap is formed between an outer circumferential surface of the outer stopper 71 and the inner circumferential surface of the through hole 84.

A first end (a left end) of an output shaft 206 is inserted into a connecting hole 62 formed in the inner shaft 34. The output shaft 206 is coupled to the inner shaft 34 by way of screw-engagement. Moreover, the output shaft 206 supports a compressor wheel 208 and a turbine wheel (not shown) that constitute the gas turbine engine 200.

The outer diameter of the outer shaft 36 is maximum at a substantially middle portion in the axial direction of the outer shaft 36. A plurality of permanent magnets 88 are retained via a magnet holder 90 on this portion. The permanent magnets 88 rotate integrally with the double structure shaft 41A.

A leftward opening of the first insertion hole 98 is closed by a disk-shaped member 102. In the disk-shaped member 102, a second insertion hole 100 that is connected to the first insertion hole 98 is formed. Although not shown in detail, the outer circumferential surface of the left open end 42*a* of the outer shaft 36 and the inner circumferential surfaces of the first insertion hole 98 and the second insertion hole 100 are slightly separated from each other.

The distal end of the second end (left end part) of the double structure shaft 41A passes through an inner hole of the first bearing 92. The second end of the double structure shaft 41A passes through the first insertion hole 98 and the second insertion hole 100, and protrudes to the outside of the first sub-housing 18. As described above, at the first end of the double structure shaft 41A, a portion that protrudes from the left end of the first bearing 92 is the extending portion 104. The second end (right end part) of the double structure shaft 41A is passed through the inner hole of the second bearing 94, and is exposed from the insertion hole 68 that is formed in the second sub-housing 20.

The stator 32 that constitutes the rotating electric machine 12 includes electromagnetic coils 116, and a plurality of insulating base members 118 around which the electromagnetic coils 116 are wound. The electromagnetic coils 116 include three types of coils, including a U-phase coil, a V-phase coil, and a W-phase coil. Therefore, in the case that the rotating electric machine 12 is a generator, the rotating electric machine 12 is a so-called three-phase power source.

The stator 32 is accommodated in an accommodation chamber 114 that is formed in the main housing 16. The second sub-housing 20 serves as a stator holder. Specifically, the second sub-housing 20 has an annular recessed portion 122. The insulating base members 118 of the stator 32 are engaged with the annular recessed portion 122. Due to such engagement, the stator 32 is positioned and fixed in place. The columnar shaped projecting portion 96 enters into the inner hole of the stator 32 from the leftward opening thereof.

Although detailed illustration thereof is omitted, an inner circumferential surface of the accommodation chamber 114 and the electromagnetic coils 116 are slightly separated away from each other. Due to such separation, the main housing 16 and the electromagnetic coils 116 are electrically insulated from each other.

A clearance is formed between the outer circumferential surface of the columnar shaped projecting portion 96 and the insulating base members 118. A clearance is also formed between the outer circumferential surfaces of the permanent magnets 88 and the inner circumferential surfaces of the electromagnetic coils 116. As will be discussed later, these clearances become a portion of the flow passage through which the curtain air, which is a gas, flows.

The first sub-housing 18 includes an annular convex portion 124 that projects out in an annular shape. An inner side of the annular convex portion 124 is formed with a hollow concave portion 126. The extending portion 104 constituting the left end part 46*a* of the inner shaft 34 is inserted into the hollow concave portion 126.

The resolver holder 26 which retains a resolver stator 130 is provided on the annular convex portion 124. The resolver holder 26 has a flange-shaped stopper 132 that is projected diametrically outward. The outer diameter of the flange-shaped stopper 132 is larger than an inner diameter of the annular convex portion 124. Accordingly, the resolver holder 26 is positioned by the flange-shaped stopper 132 coming into abutment against the annular convex portion 124. In this state, the resolver holder 26 is connected to the first sub-housing 18, for example, via mounting bolts (not shown).

The resolver holder 26 has a small cylindrical portion 134 positioned to the left of the flange-shaped stopper 132, and a large cylindrical portion 136 positioned to the right of the flange-shaped stopper 132 and being larger in diameter than the small cylindrical portion 134. A retaining hole 138 is formed in the resolver holder 26. A right end of the resolver stator 130 is fitted into the retaining hole 138. When the large cylindrical portion 136 enters into the hollow concave portion 126 and the flange-shaped stopper 132 abuts against the annular convex portion 124, the resolver rotor 56, which is retained by the left end part 46*a* of the inner shaft 34, is positioned in the inner hole of the resolver stator 130. The resolver stator 130 and the resolver rotor 56 constitute the resolver 140 which serves as a rotational parameter detector. The resolver 140 detects an angle of rotation, for example.

A signal receiver connector 144 is fitted into a fitting hole 142 formed in the flange-shaped stopper 132. The resolver stator 130 and the signal receiver connector 144 are electrically connected to each other via a signal line 146. A receiver-side connector of a signal receiver (not shown), which receives signals emitted by the resolver 140, is inserted onto the signal receiver connector 144. The resolver 140 and a signal receiver are electrically connected via the signal receiver connector 144 and the receiver-side connector.

A plurality of tab portions 148 (which are omitted from illustration in FIG. 1) are provided on the small cylindrical portion 134. One of the tab portions 148 is shown in FIG. 2. Furthermore, the small cylindrical portion 134 is covered with the cap cover 28, which closes a leftward opening of the small cylindrical portion 134 and shields the left end part 46*a* of the inner shaft 34. The cap cover 28 is connected to the tab portions 148 via connecting bolts 150.

As noted previously, the terminal casing 22 and the measuring device casing 24 are integrally provided on a side wall in proximity to the left end of the main housing 16. Among these elements, a thermistor 152, which is a temperature measuring device, is accommodated in the measuring device casing 24. Although not illustrated in particular, measurement terminals of the thermistor 152 are drawn out from the measuring device casing 24 and are connected to the electromagnetic coils 116. A harness 154, which is connected to the thermistor 152, is drawn out to the outside of the measuring device casing 24.

In the terminal casing 22 which is adjacent to the measuring device casing 24, there are accommodated a U-phase terminal 156*a*, a V-phase terminal 156*b*, and a W-phase terminal 156*c* that are electrically connected to ends of a U-phase coil, a V-phase coil, and a W-phase coil. The U-phase terminal 156*a*, the V-phase terminal 156*b*, and the W-phase terminal 156*c* are electrically connected to external devices such as batteries (not shown). That is, the U-phase terminal 156*a*, the V-phase terminal 156*b*, and the W-phase terminal 156*c* are connectors for connecting external devices. Moreover, an internal space of the measuring device casing 24 and an internal space of the terminal casing 22 communicate with each other through a non-illustrated casing-to-casing communication hole.

As shown in FIG. 2, the hollow pipe members 158*a* to 158*c*, which are provided on the outer circumferential surface of the side wall of the main housing 16, are positioned externally of the cooling jacket 21 that is formed in an interior part of the side wall of the main housing 16. In this instance, according to the first embodiment, although a case is illustrated in which three of the hollow pipe members 158*a* to 158*c* are provided, the number of the hollow pipe members is appropriately determined depending on a required flow rate and a required flow velocity of the curtain air. More specifically, the number of the hollow tube portions is not limited to being three. Further, in a similar manner, the cross-sectional area of each of the hollow pipe members is appropriately determined in accordance with the required flow rate or the required flow velocity of the curtain air.

Right ends of the hollow pipe members 158*a* to 158*c* individually overlap with the three downstream side communication holes 80*a* to 80*c* that are formed in the second sub-housing 20. More specifically, the collection flow path 74 communicates with the hollow interior parts of the hollow pipe members 158*a* to 158*c* via the upstream side communication holes 76, the relay communication passages 78, and the downstream side communication holes 80*a* to 80*c* (see FIG. 1). In FIG. 2, only the downstream side communication hole 80*b* is shown. On the other hand, the left end of the hollow pipe member 158*a* communicates with the hollow interior of the measuring device casing 24. The left ends of the hollow pipe members 158*b* and 158*c* communicate with the hollow interior of the terminal casing 22.

The curtain air flows on an upstream side through the collection flow path 74, and flows on a downstream side through the measuring device casing 24 and the terminal casing 22. In this manner, the hollow pipe members 158*a* to 158*c* are portions of the compressed air flow passage through which the curtain air flows. Moreover, the curtain air is a portion of the compressed air that is supplied from the gas turbine engine 200.

An internal space of the terminal casing 22 is in communication with the accommodation chamber 114. Therefore, the curtain air flowing into the internal space of the terminal casing 22 can flow into the accommodation chamber 114 and individually contact the first bearing 92 and the second bearing 94.

A coolant flow path 170 is provided on the double structure shaft 41A. Specifically, the coolant flow path 170 has a first flow path 172 formed in the inner shaft 34, a second flow path 174A formed between the outer shaft 36 and the magnet holder 90, and a communication flow path 176 that places the first flow path 172 and the second flow path 174A in communication with each other. The coolant flow path 170 further includes a relay flow path 178 formed in the inner shaft 34.

The inner shaft 34 has a first small diameter portion 180, a second small diameter portion 181, and a large diameter portion 182 located between the first small diameter portion 180 and the second small diameter portion 181. The first small diameter portion 180 is close to a first end (left end part 46*a*) in the axial direction of the inner shaft 34. However, the first small diameter portion 180 is closer to the second end (right end part 46*b*) than the extending portion 104 is. The large diameter portion 182 is closer to the second end than the first small diameter portion 180 is. The second small diameter portion 181 is closer to the second end than the large diameter portion 182 is.

The first small diameter portion 180 and the second small diameter portion 181 have substantially the same diameter. The outer circumferential surfaces of the first small diameter portion 180 and the second small diameter portion 181 are not in contact with the inner circumferential surface of the outer shaft 36. That is, the outer circumferential surfaces of the first small diameter portion 180 and the second small diameter portion 181 are not in contact with the inner circumferential surface of the outer shaft 36. On the other hand, the diameter of the large diameter portion 182 is larger than the diameters of the first small diameter portion 180 and the second small diameter portion 181. The outer circumferential surface of the large diameter portion 182 is close to the inner circumferential surface of the outer shaft 36.

The first flow path 172 is provided in the radial center portion (on the rotation axis line) of the inner shaft 34. The first flow path 172 extends linearly toward the large diameter portion 182 along the axial direction of the inner shaft 34, in the interior part of the first small diameter portion 180. The second flow path 174A is formed in a spiral shape in the outer circumferential portion of the outer shaft 36. The second flow path 174A may be a flow path extending linearly along the axial direction of the outer shaft 36, as in the case of a second flow path 174C shown in FIG. 4. The relay flow path 178 and the communication flow path 176 are positioned between the first flow path 172 and the second flow path 174A. The relay flow path 178 is positioned upstream of the communication flow path 176 in the flow direction of the liquid coolant. In other words, the relay flow path 178 is interposed between the first flow path 172 and the communication flow path 176.

The relay flow path 178 extends from the inner side toward the outer side in the diametrical direction of the inner shaft 34. The communication flow path 176 extends from the inner side toward the outer side in the diametrical direction of the outer shaft 36. Accordingly, the liquid coolant flowing through the first flow path 172 moves to the relay flow path 178 and the communication flow path 176, and thereby flows from the inner side in the diametrical direction toward the outer side in the diametrical direction of the double structure shaft 41A.

In this configuration, the double structure shaft 41A has a first seal member 184 and a second seal member 186 provided in the large diameter portion 182. In the large diameter portion 182, the first seal member 184 is mounted at a position closer to the first end (left end part 46*a*) than the outlet of the relay flow path 178 is. In the large diameter portion 182, the second seal member 186 is mounted at a position closer to the second end (right end part 46*b*) than the outlet of the relay flow path 178 is. That is, the outlet of the relay flow path 178 is positioned between the first seal member 184 and the second seal member 186 in the axial direction of the double structure shaft 41A.

An outer groove 188 is formed in a spiral shape (or a linear shape) on the outer circumferential surface of the outer shaft 36. The outer groove 188 is covered with the magnet holder 90, thereby forming the second flow path 174A.

The rotating electric machine system 10 is provided with a coolant supply unit 190 for supplying a coolant to the coolant flow path 170. In order to simplify the description, a case where the coolant is oil will be described as an example. The coolant supply unit 190 includes an oil supply device (not shown) and an oil discharge member 192 shown in FIG. 2. The oil discharge member 192 is inserted into the internal space of the resolver holder 26. The oil discharge member 192 has a nozzle portion 194 facing the first flow path 172.

The rotating electric machine system 10 is basically configured as described above. Moreover, it should be noted that the configuration of the gas turbine engine 200, for example, is similar to the configuration shown in FIG. 8 of JP 2022-157784 A. Therefore, the description of the gas turbine engine 200 will be kept brief.

The gas turbine engine 200 includes an engine housing 201. The engine housing 201 includes an inner housing 202 and an outer housing 204. The inner housing 202 faces toward the second sub-housing 20 of the rotating electric machine system 10. The outer housing 204 is connected to the inner housing 202.

The inner housing 202 has a plurality of individual leg members 212. In the illustrated example, the number of the leg members 212 is six. However, the number of the leg members 212 is determined in accordance with the necessary coupling strength required between the gas turbine engine 200 and the rotating electric machine system 10. Stated otherwise, the number of the leg members 212 is not limited to being six as in the illustrated example. An air intake space 214 is formed between the leg members 212.

The gas turbine engine 200 includes the output shaft 206 coupled to the double structure shaft 41A. A non-illustrated compressor wheel and a non-illustrated turbine wheel are mounted diametrically outward of the output shaft 206. The compressor wheel 208 and the turbine wheel are capable of rotating integrally together with the double structure shaft 41A and the output shaft 206.

Next, a description will be given concerning operations of the combined power system 300.

First, an alternating current is supplied to the plurality of electromagnetic coils 116 (the U-phase coil, the V-phase coil, and the W-phase coil) via the U-phase terminal 156*a*, the V-phase terminal 156*b*, and the W-phase terminal 156*c*. By the alternating current flowing through the electromagnetic coils 116, an alternating magnetic field is generated in the stator 32. Therefore, attractive forces and repulsive forces act alternately between the electromagnetic coils 116 and the permanent magnets 88 of the rotor 30. As a result, the double structure shaft 41A starts to rotate. Alternatively, the double structure shaft 41A may be rotated by a well-known type of starter (not shown).

A rotational torque of the double structure shaft 41A is transmitted to the output shaft 206 via the compressor wheel 208. More specifically, when the double structure shaft 41A begins to rotate, the output shaft 206 also starts rotating integrally together with the double structure shaft 41A. Along therewith, the compressor wheel 208 and the non-illustrated turbine wheel, which are supported on the output shaft 206, rotate integrally together with the output shaft 206.

After the gas turbine engine 200 has been started in the manner described above, the output shaft 206 rotates accompanying the driving of the gas turbine engine 200. Accordingly, even if the supply of the electrical current to the electromagnetic coils 116 is stopped, the double structure shaft 41A rotates integrally together with the output shaft 206.

Since the double structure shaft 41A retains the permanent magnets 88, the AC current is generated in the electromagnetic coils 116 that surround the permanent magnets 88. Via a U-phase terminal 15*a*, a V-phase terminal 15*b*, and a W-phase terminal 15*c*, the alternating current is delivered to a non-illustrated current converter. By the current converter, the alternating current is converted into a direct current. When a non-illustrated control circuit has determined that the output of the external load electrically connected to the battery has decreased, the current converter supplies the direct current to the battery. Consequently, charging is carried out on the battery.

By the output shaft 206 undergoing rotation, atmospheric air is drawn into the engine housing 201 via the air intake space 214 provided between the leg members 212 of the inner housing 202. The atmospheric air that is drawn into the engine housing 201 is compressed by the compressor wheel 208. In accordance therewith, the compressed air is generated. One portion of this compressed air is supplied to the interior of the rotating electric machine housing 14.

Specifically, the compressed air flows into the collection flow path 74, and is spread out in an annular shape. The compressed air further passes from the collection flow path 74 through the upstream side communication holes 76, and after having been distributed into the relay communication passages 78, flows respectively from each of the three individual downstream side communication holes 80*a* to 80*c* and through the hollow interior parts of the hollow pipe members 158*a* to 158*c* shown in FIG. 1, etc.

The hollow pipe members 158*a* to 158*c* are positioned on the outer circumferential side of the cooling jacket 21. Accordingly, as the compressed air flows along the hollow pipe members 158*a* to 158*c*, the heat of the compressed air is sufficiently conducted to the coolant in the cooling jacket 21. Consequently, the compressed air becomes relatively low in temperature. More specifically, according to the present embodiment, in accordance with the cooling jacket 21 that serves in order to cool the rotating electric machine 12 or the like, the temperature of the compressed air can be lowered.

The compressed air flowing through the hollow pipe member 158*a* flows into the internal space of the measuring device casing 24, as shown in FIG. 2. Consequently, the air curtain is formed inside the measuring device casing 24. Surplus compressed air flows into the hollow interior of the terminal casing 22 through the casing-to-casing communication hole (not shown). An air curtain is formed inside the terminal casing 22 by such surplus compressed air, and by the compressed air that has flowed through the hollow pipe members 158*b* and 158*c* and into the internal space of the terminal casing 22.

As shown in FIG. 2, the surplus compressed air inside the terminal casing 22 flows into the accommodation chamber 114 that is formed in the main housing 16. In this instance, from the fact that the terminal casing 22 and the measuring device casing 24 are disposed on the left side of the main housing 16, the compressed air flows inwardly from the left end of the accommodation chamber 114. Thereafter, the compressed air enters into the clearances between the outer circumferential surface of the columnar shaped projecting portion 96 of the stator 32 and the insulating base members 118.

Thereafter, a portion of the compressed air flows toward the side of the first insertion hole 98. Further, the remaining portion of the compressed air flows through the clearances between the outer circumferential surfaces of the permanent magnets 88 and the inner circumferential surfaces of the electromagnetic coils 116, toward the insertion hole 68. In this manner, the compressed air branches into a portion that flows toward the first insertion hole 98 at the left end (the first end part), and a portion that flows toward the insertion hole 68 at the right end (the second end part).

The compressed air that has flowed toward the first insertion hole 98 forms an air curtain for the first bearing 92 disposed inside the first insertion hole 98. On the other hand, the compressed air that has flowed toward the insertion hole 68 forms an air curtain for the second bearing 94 disposed inside the insertion hole 68. In this instance, the lubricating oil is supplied in the form of a jet flow to the first bearing 92 and the second bearing 94. The air curtain suppresses the scattering of the lubricating oil in the rotating electric machine housing 14. Moreover, an air curtain made of compressed air is formed in the internal spaces of the terminal casing 22 and the measuring device casing 24. Accordingly, even if the lubricating oil enters into the internal spaces of the terminal casing 22 and the measuring device casing 24, adhering of the lubricating oil to the U-phase terminal 156*a*, the V-phase terminal 156*b*, the W-phase terminal 156*c*, the thermistor 152, and the like is suppressed by the air curtain.

Thereafter, the compressed air in which the lubricating oil is contained due to formation of the air curtain passes through, e.g., a lubricating oil discharge path, and are discharged into an oil tank (neither of the lubricating discharge path nor the oil tank is shown), and the compressed air is separated into the lubricating oil and the air. The lubricating oil is supplied again to the first bearing 92 and the second bearing 94. On the other hand, the air is discharged, for example, into the atmosphere.

Accompanying the rotation of the double structure shaft 41A along with the permanent magnets 88, an alternating current is generated in the electromagnetic coils 116. The alternating current is sent to a current converter (not shown) via the U-phase terminal 156*a*, the V-phase terminal 156*b*, and the W-phase terminal 156*c*. The current converter converts such an AC current into a DC current. At a time when it has been determined that the output of an external load (for example, a motor) which is electrically connected to the battery has decreased, the current converter supplies the DC current to the battery. Consequently, charging is carried out on the battery.

The electromagnetic coils 116 generate heat as the electrical current flows therethrough. As described above, the rotating electric machine system 10 is provided with the coolant supply unit 190 and the coolant flow path 170. From the coolant supply unit 190, the coolant such as oil is supplied. The oil is preferably the lubricating oil that is supplied to the first bearing 92 and the second bearing 94. This case will be described below by way of example.

A cooling oil supplied from the oil supply device is discharged from the nozzle portion 194 of the oil discharge member 192. Though the inner shaft 34 is rotated, the first flow path 172 is provided in the radial center portion of the inner shaft 34, and the nozzle portion 194 faces toward the first flow path 172. Therefore, the cooling oil discharged from the nozzle portion 194 can flow into the first flow path 172 formed in the inner shaft 34 without any hindrance. As the cooling oil is further discharged from the nozzle portion 194, the cooling oil moves from the left end part 46*a* (first end part) of the inner shaft 34 toward the right end part 46*b* (second end part) along the first flow path 172. After reaching the large diameter portion 182, the cooling oil flows from the radially inward side of the large diameter portion 182 toward radially outward side along the relay flow path 178 formed in the large diameter portion 182. In this way, the flow direction of the cooling oil is changed by the relay flow path 178.

The outlet of the relay flow path 178 is positioned between the first seal member 184 and the second seal member 186. Accordingly, the cooling oil is prevented from leaking out into the space between the outer circumferential surface of the first small diameter portion 180 and the inner circumferential surface of the outer shaft 36. Similarly, the cooling oil is prevented from leaking out into the space between the outer circumferential surface of the second small diameter portion 181 and the inner circumferential surface of the outer shaft 36.

The cooling oil moves from the relay flow path 178 to the communication flow path 176. The outer circumferential surface of the large diameter portion 182 is close to the inner circumferential surface of the outer shaft 36. Therefore, the gap between the relay flow path 178 and the communication flow path 176 is small. Therefore, the leakage of the cooling oil from the gap is suppressed.

The cooling oil moves from the communication flow path 176 to the second flow path 174A. Since the second flow path 174A is formed in a spiral shape, the cooling oil flowing through the second flow path 174A moves toward the second end of the double structure shaft 41A while swirling in a spiral shape. Accordingly, the permanent magnets 88 exposed to the heat of the electromagnetic coils 116 can be cooled uniformly. As described above, according to the first embodiment, the permanent magnets 88 can be efficiently cooled by the cooling oil flowing through the coolant flow path 170 at the same time as the electromagnetic coils 116 are cooled.

In addition, since the coolant flow path 170 is provided in the double structure shaft 41A, the cooling oil as the coolant flows in the double structure shaft 41A. Therefore, any concern that foreign substance may be mixed into the cooling oil from the outside of the double structure shaft 41A can be dispensed with.

The cooling oil flowing through the coolant flow path 170 can be supplied to the second bearing 94 as a lubricating oil, for example. In this case, the cooling oil and the lubricating oil can be supplied to the second bearing 94 from the same oil supply device. Accordingly, it is not necessary to separately install the coolant supply device and the lubricating oil supply device. Therefore, it is possible to simplify the rotating electric machine system 10.

Figure 3:
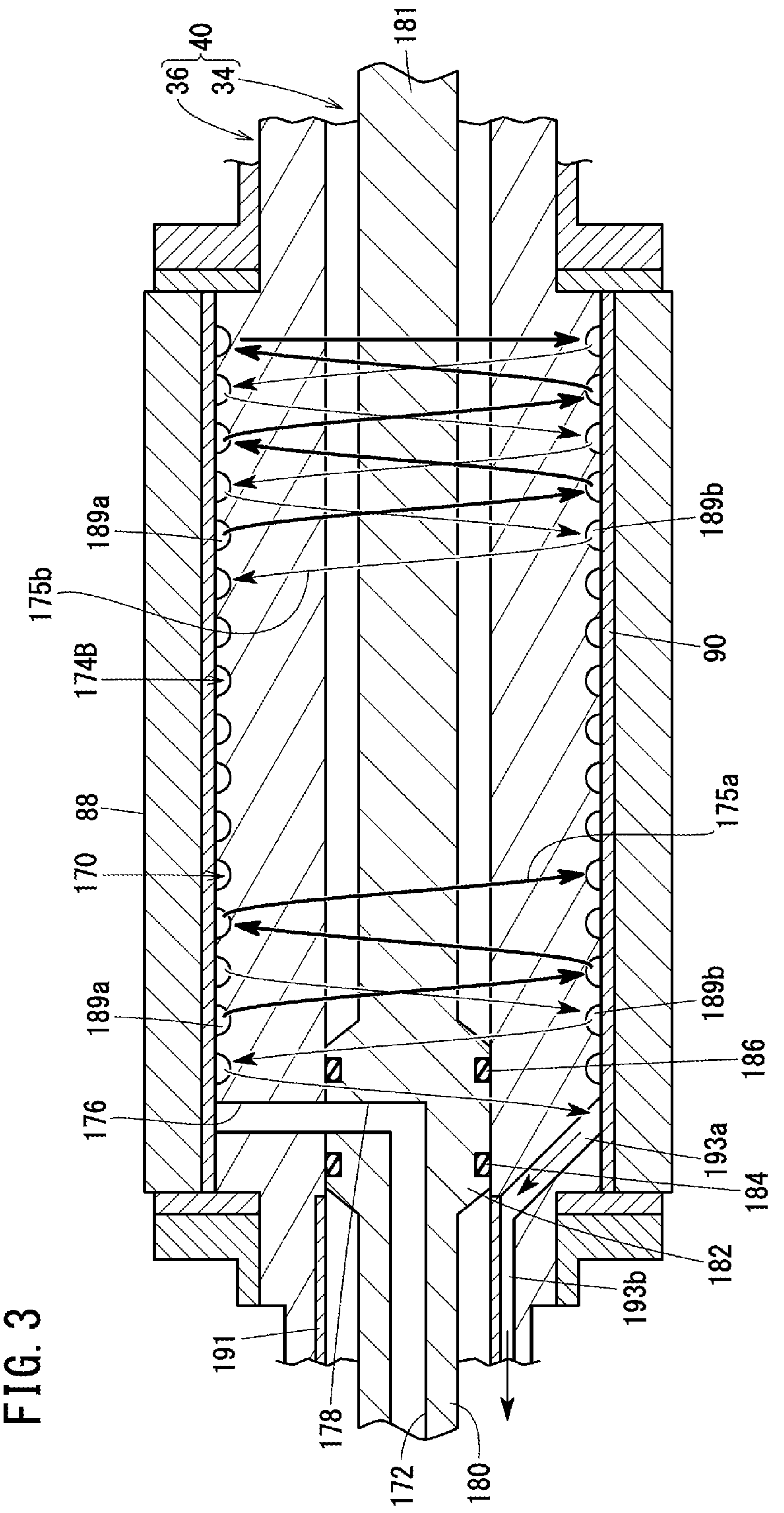
FIG. 3 is a schematic cross-sectional view of principal components, taken along an axial direction of a rotating shaft of a rotating electric machine according to a modification of the first embodiment.

Next, a modification of the first embodiment will be described with reference to FIG. 3. Moreover, it should be noted that the same reference numerals basically designate the same constituent elements as those shown in FIG. 2.

In the modification of the first embodiment, a second flow path 174B has a first outer groove 189*a* formed in a spiral shape and a second outer groove 189*b* formed in a spiral shape. In other words, the first outer groove 189*a* and the second outer groove 189*b* have a double helix structure. The first outer groove 189*a* is covered with the magnet holder 90 to form an outward route, and the second outer groove 189*b* is covered with the magnet holder 90 to form a homeward route. That is, the second flow path 174B include has an outbound path 175*a* and an inbound path 175*b*. The outbound path 175*a* extends from a first end (left open end 42*a*), which is one end of the outer shaft 36, toward a second end (right open end 42*b*), which is another end. The inbound path 175*b* extends from the second end (right open end 42*b*) of the outer shaft 36 toward the first end (left open end 42*a*). The outbound path 175*a* is provided from the vicinity of the first ends to the vicinity of the second ends of the permanent magnets 88. The inbound path 175*b* is provided from the vicinity of the second ends to the vicinity of the first ends of the permanent magnets 88.

A double structure shaft 41A has a tubular body 191 retained by the outer shaft 36. The tubular body 191 surrounds the outer circumferential surface of the first small diameter portion 180 of the inner shaft 34. The second flow path 174B has a first discharge path 193*a* extending from the inbound path 175*b* toward the first small diameter portion 180, and a second discharge path 193*b* formed between the tubular body 191 and the outer shaft 36.

In this case, the cooling oil discharged from the nozzle portion 194 (see FIG. 2) of the oil discharge member 192 is transferred to the outbound path 175*a* of the second flow path 174B through the first flow path 172, the relay flow path 178, and the communication flow path 176 in the same manner as described above. The cooling oil flows from the first end toward the second end of the double structure shaft 41A along the spiral outbound path 175*a*, and thereafter returns from the second end to the first end of the double structure shaft 41A along the spiral inbound path 175*b*. As described above, the cooling oil flows through the outbound path 175*a* and the inbound path 175*b*, whereby the permanent magnets 88 can be cooled uniformly.

The cooling oil flowing through the inbound path 175*b* can be discharged to the outside of the double structure shaft 41A via the first discharge path 193*a* and the second discharge path 193*b*. In this modification, the cooling oil as the coolant is not supplied to the second bearing 94. Accordingly, it is not necessary to use cooling oil as a coolant. The coolant may be an organic solvent which has a high melting point and low volatility.

Next, a rotating electric machine 13 according to a second embodiment will be described with reference to FIG. 4. Moreover, it should be noted that the same reference numerals basically designate the same constituent elements as those shown in FIG. 2.

Figure 4:
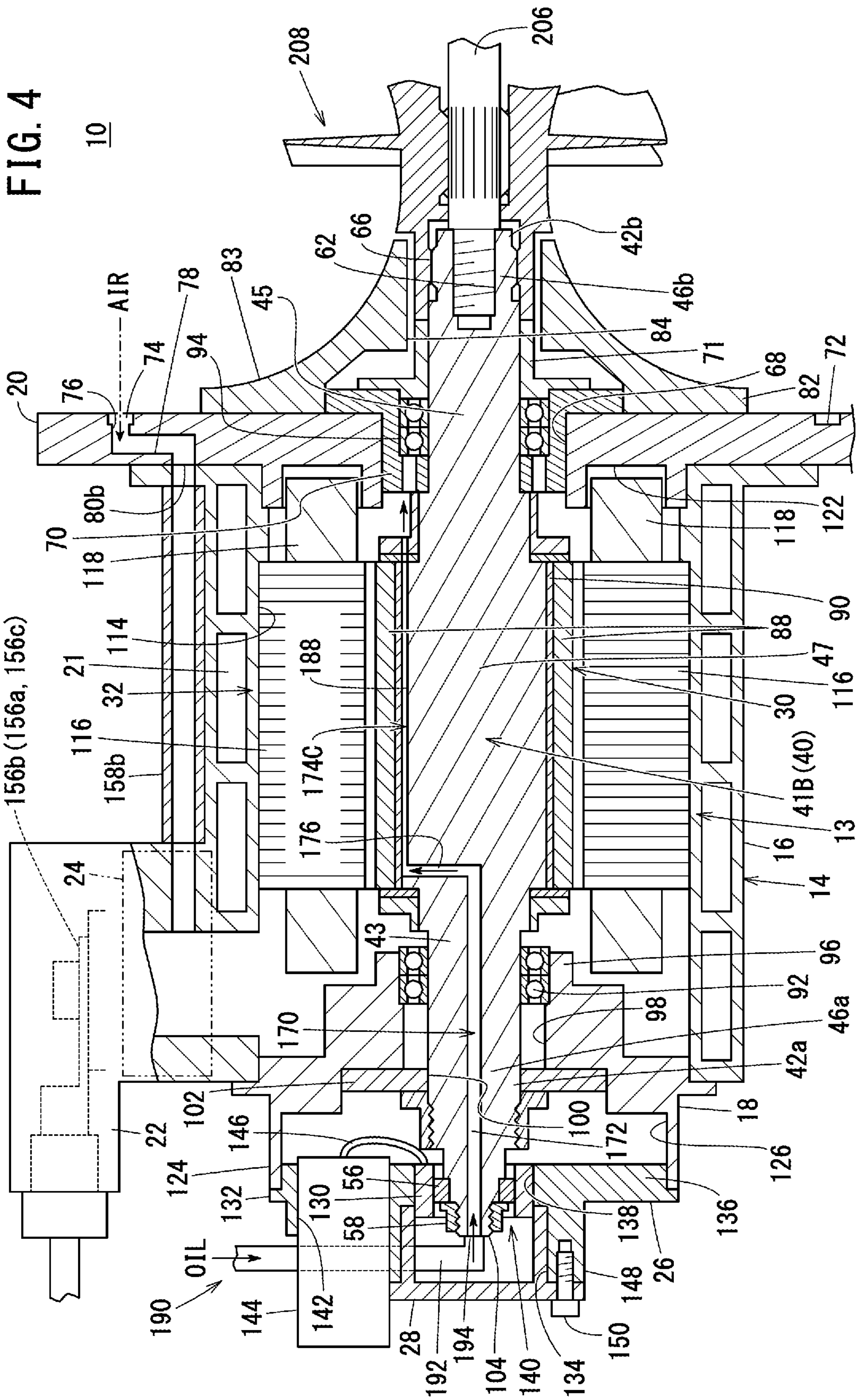
FIG. 4 is a schematic cross-sectional view of a combined power system including a rotating electric machine system according to a second embodiment of the present invention taken along an axial direction thereof.

As can be understood from FIG. 4, the rotating electric machine 13 according to the second embodiment includes a single structure shaft 41B made of a single member as the rotating shaft 40. The single structure shaft 41B has a first small diameter portion 43, a second small diameter portion 45, and a large diameter portion 47 positioned between the first small diameter portion 43 and the second small diameter portion 45. The first small diameter portion 43 is close to a first end in the axial direction of the single structure shaft 41B. However, the first small diameter portion 43 is closer to the second end than the extending portion 104 is. The large diameter portion 47 is closer to the second end than the first small diameter portion 43 is. The second small diameter portion 45 is closer to the second end than the large diameter portion 47 is.

On outer circumferential surfaces of the first small diameter portion 43 and the second small diameter portion 45, the first bearing 92 and the second bearing 94 are respectively disposed. On an outer circumferential surface of the large diameter portion 47, which has a larger diameter than those of the first small diameter portion 43 and the second small diameter portion 45, the permanent magnets 88 are disposed via the magnet holder 90.

A coolant flow path 170 is provided on the single structure shaft 41B. The coolant flow path 170 has a first flow path 172 formed inside the single structure shaft 41B, the second flow path 174C formed outside the single structure shaft 41B, and a communication flow path 176 interposed between the first flow path 172 and the second flow path 174C. A terminal end (downstream side end part) of the first flow path 172 communicates with an upstream side end part of the second flow path 174C via the communication flow path 176. Here, a plurality of outer grooves 188 are formed each in a linear shape on an outer circumferential surface of the single structure shaft 41B. The plurality of outer grooves 188 are covered with the magnet holder 90, whereby the second flow path 174C is formed on the outer circumferential side of the first flow path 172. The extending directions of the first flow path 172, the second flow path 174C, and the communication flow path 176 are the same as those of the first flow path 172, the second flow path 174A, and the communication flow path 176 in the first embodiment, and therefore, detailed description thereof will be omitted.

As in the first embodiment, the oil discharge member 192 is disposed in the internal space of the resolver holder 26. The nozzle portion 194 of the oil discharge member 192 faces toward the first flow path 172.

In the rotating electric machine 13, the cooling oil flows in order of the first flow path 172, the communication flow path 176, and the second flow path 174C. In accordance with this feature, the permanent magnets 88 are cooled uniformly. The cooling oil flowing through the coolant flow path 170 is supplied to the second bearing 94 as a lubricating oil. Therefore, the same advantageous effects as those of the first embodiment can be obtained in the second embodiment.

Although not particularly shown, the outer grooves 188 may be formed in a spiral shape as shown in FIG. 2. Also in the second embodiment, a second flow path 174B having an outbound path 175*a* and an inbound path 175*b* may be formed as in the modification of the first embodiment (see FIG. 3).

The advantageous effects of the present embodiment, including those described above, can be summarized in the following manner.

The rotating electric machine 12 includes the rotor 30 provided with the permanent magnets 88 and the rotating shaft 40, and the stator 32 surrounding the rotor 30. The rotating shaft 40 includes the outer shaft 36 having a hollow tubular shape, the inner shaft 34 configured to be inserted in the interior of the outer shaft 36, and the coolant flow path 170 through which the coolant flows. The coolant flow path 170 includes the first flow path 172 formed in the inner shaft 34, the second flow path 174A formed in the outer shaft 36, and the communication flow path 176 configured to place the first flow path 172 and the second flow path 174A in communication with each other.

The permanent magnets 88 can be efficiently cooled by the coolant flowing through the interior of the rotating shaft 40. Further, since the coolant flows in the interior of the rotating shaft 40, any concern that foreign substance may be mixed into the coolant from the outside of the rotating shaft 40 can be dispensed with.

The first flow path 172 is disposed upstream in the flow direction in which the coolant flows, and the second flow path 174A is disposed downstream in the flow direction of the coolant. The communication flow path 176 is positioned between the first flow path 172 and the second flow path 174A.

It is easier to supply the coolant to the first flow path 172 formed in the inner shaft 34 than to form the first flow path 172 in the outer shaft 36 and supply the coolant to the first flow path 172.

The inner shaft 34 includes the first small diameter portion 180 and the second small diameter portion 181, and the outer circumferential surfaces of them are not in contact with the inner circumferential surface of the outer shaft 36. The inner shaft 34 includes the large diameter portion 182 that is positioned between the first small diameter portion 180 and the second small diameter portion 181 and has the diameter larger than that of the first small diameter portion 180 and that of the second small diameter portion 181. The first small diameter portion 180 is positioned at one end part of the inner shaft 34 in the axial direction. The first flow path 172 is formed in the interior of the first small diameter portion 180. The second flow path 174A is formed in the outer circumferential portion of the outer shaft 36. The communication flow path 176 extends from the inner side toward the outer side of the outer shaft 36 in the diametrical direction of the outer shaft 36.

By forming the communication flow path 176 as described above, it is easy to move the coolant from the first flow path 172 formed in the inner shaft 34 to the second flow path 174A formed in the outer shaft 36.

The large diameter portion 182 has the relay flow path 178. The relay flow path 178 is interposed between the first flow path 172 and the communication flow path 176, and extends from the inner side toward the outer side of the inner shaft 34 in the diametrical direction of the inner shaft 34.

The outer circumferential surface of the large diameter portion 182 is closer to the inner circumferential surface of the outer shaft 36 than the outer circumferential surfaces of the first small diameter portion 180 and the second small diameter portion 181 are. Therefore, the gap between the relay flow path 178 and the communication flow path 176 can be reduced. Therefore, the leakage of the coolant through the gap can be suppressed.

The rotating shaft 40 includes the first seal member 184 and the second seal member 186 interposed between the outer circumferential surface of the large diameter portion 182 and the inner circumferential surface of the outer shaft 36. The outlet of the relay flow path 178 is positioned between the first seal member 184 and the second seal member 186 in the axial direction of the rotating shaft 40.

Since the outlet of the relay flow path 178 is positioned between the first seal member 184 and the second seal member 186, the coolant is prevented from leaking out into the space between the outer circumferential surface of the first small diameter portion 180 and the inner circumferential surface of the outer shaft 36. Similarly, the coolant is also prevented from leaking out into the space between the outer circumferential surface of the second small diameter portion 181 and the inner circumferential surface of the outer shaft 36.

The first flow path 172 is a space extending linearly in the axial direction and toward the large diameter portion 182, in the interior of the first small diameter portion 180.

Since the first flow path 172 is linear, the first flow path 172 can be easily formed.

The rotating shaft 40 includes the magnet holder 90 configured to cover the outer circumferential surface of the outer shaft 36 and retain the permanent magnets 88. The second flow path 174A is formed between the outer shaft 36 and the magnet holder 90.

In this case, it is not necessary to form the coolant flow path 170 inside the outer shaft 36. Accordingly, it is easy to form the second flow path 174A in the outer shaft 36.

The outer groove 188 is provided in the outer circumferential surface of the outer shaft 36. The second flow path 174A is formed by covering the outer groove 188 with the magnet holder 90.

The outer groove 188 is formed in the outer circumferential surface of the outer shaft 36, and the outer groove 188 is covered with the magnet holder 90, whereby the second flow path 174A can be formed. Accordingly, the second flow path 174A can be easily formed.

The coolant is oil, and the coolant that has flowed through the second flow path 174A is supplied to the second bearing 94 that rotatably supports the rotating shaft 40 in the rotating electric machine housing 14.

Since the coolant (cooling oil) also serves as the lubricating oil for the second bearing 94, the cooling oil and the lubricating oil can be supplied to the rotating electric machine system 10 from the same oil supply device. That is, it is not necessary to separately install the oil supply device (the coolant supply device) and the lubricating oil supply device. Therefore, the configuration of the rotating electric machine system 10 can be simplified.

The second flow path 174B includes the outbound path 175*a* extending from the first end (left open end 42*a*), which is one end part of the outer shaft 36, toward the second end (right open end 42*b*), which is the other end part of the outer shaft 36, and the inbound path 175*b* communicating with the outbound path 175*a* and extending from the second end (left open end 42*a*) toward the first end (right open end 42*b*) of the outer shaft 36.

In this case, a supply unit for supplying the coolant from the first flow path 172 to the outbound path 175*a* and a recovery unit for recovering the coolant that has flowed through the inbound path 175*b*, can be provided at the first end of the rotating shaft 40 in a concentrated manner.

The rotating shaft 40 has a tubular body 191 that is retained by the outer shaft 36 and that surrounds the outer circumferential surface of the first small diameter portion 180. The second flow path 174B includes the outbound path 175*a* extending from the first end (left open end 42*a*) of the outer shaft 36 toward the second end (right open end 42*b*), and the inbound path 175*b* communicating with the outbound path 175*a* and extending from the second end (left open end 42*a*) of the outer shaft 36 toward the first end (right open end 42*b*). The second flow path 174B further includes the first discharge path 193*a* extending from the inbound path 175*b* toward the first small diameter portion 180, and the second discharge path 193*b* formed between the tubular body 191 and the outer shaft 36.

According to the above structure, it is easy to discharge the coolant that has flowed through the inbound path 175*b* to the outside of the rotating shaft 40.

The inner shaft 34 has the extending portion 104 protruding in the axial direction from one end (e.g., the first end) of the outer shaft 36 in the axial direction.

Since the first flow path 172 is formed in the extending portion 104, the coolant can be easily supplied to the first flow path 172. Therefore, the outer shaft 36, the permanent magnets 88, or the like is prevented from being contaminated by the coolant.

The rotating electric machine 13 includes the rotor 30 provided with the permanent magnets 88 and the rotating shaft 40 (single structure shaft 41B), and the stator 32 surrounding the rotor 30. The single structure shaft 41B, which is the rotating shaft 40, has the coolant flow path 170 through which the coolant flows. The coolant flow path 170 includes the first flow path 172, the second flow path 174C, and the communication flow path 176. The first flow path 172 extends from one end part of the single structure shaft 41B toward the other end part thereof along the axial direction of the single structure shaft 41B. The second flow path 174C communicates with the terminal end of the first flow path 172 in the flow direction in which the coolant flows, and extends toward the other end part of the single structure shaft 41B on the outer circumferential side of the first flow path 172. The communication flow path 176 extends from the inner side toward the outer side of the single structure shaft 41B in the diametrical direction of the single structure shaft 41B, and places the terminal end of the first flow path 172 and the second flow path 174C in communication with each other.

In this way, even when the rotating shaft 40 is the single structure shaft 41B, the permanent magnets 88 can be efficiently cooled by the coolant flowing through the interior of the rotating shaft 40. Further, since the coolant flows in the interior of the rotating shaft 40, any concern that foreign substance may be mixed into the coolant from the outside of the rotating shaft 40 can be dispensed with.

The coolant is oil, and the coolant that has flowed through the second flow path 174C is supplied to the second bearing 94 that rotatably supports the single structure shaft 41B, which is the rotating shaft 40, in the rotating electric machine housing 14.

Since the coolant (cooling oil) also serves as the lubricating oil for the second bearing 94, the cooling oil and the lubricating oil can be supplied to the rotating electric machine system 10 from the same oil supply device. That is, it is not necessary to separately install the oil supply device (the coolant supply device) and the lubricating oil supply device. Therefore, the configuration of the rotating electric machine system 10 can be simplified.

With respect to the above disclosure, the following Supplementary Notes are disclosed.

Supplementary Note 1

The rotating electric machine (12, 13) includes the rotor (30) and the stator (32) surrounding the rotor, the rotor including the permanent magnet (88) and the rotating shaft (40). The rotating shaft includes the outer shaft (36) having the hollow tubular shape, the inner shaft (34) configured to be inserted in the interior of the outer shaft, and the coolant flow path (170) through which the coolant flows. The coolant flow path includes the first flow path (172) formed in the inner shaft, the second flow path (174A, 174B) formed in the outer shaft, and the communication flow path (176) configured to place the first flow path and the second flow path in communication with each other.

The permanent magnet can be efficiently cooled by the coolant flowing through the interior of the rotating shaft. Further, since the coolant flows in the interior of the rotating shaft, any concern that foreign substance may be mixed into the coolant from the outside of the rotating shaft can be dispensed with.

Supplementary Note 2

In the rotating electric machine according to Supplementary Note 1, the first flow path may be disposed upstream in the flow direction in which the coolant flows, the second flow path may be disposed downstream in the flow direction, and the communication flow path may be positioned between the first flow path and the second flow path.

It is easier to supply the coolant to the first flow path formed in the inner shaft than to form the first flow path in the outer shaft and supply the coolant to the first flow path.

Supplementary Note 3

In the rotating electric machine according to Supplementary Note 2, the inner shaft may include the first small diameter portion (180) and the second small diameter portion (181) whose outer circumferential surfaces are not in contact with the inner circumferential surface of the outer shaft, and the large diameter portion (182) positioned between the first small diameter portion and the second small diameter portion and having the diameter larger than the diameter of the first small diameter portion and the diameter of the second small diameter portion, the first small diameter portion being positioned at one end part of the inner shaft in the axial direction of the inner shaft, the first flow path may be formed in the interior of the first small diameter portion, the second flow path may be formed in the outer circumferential portion of the outer shaft, and the communication flow path may extend from the inner side toward the outer side of the outer shaft in the diametrical direction of the outer shaft.

The communication flow path formed in such a manner as described above, it is easy to move the coolant from the first flow path formed in the inner shaft to the second flow path formed in the outer shaft.

Supplementary Note 4

In the rotating electric machine according to Supplementary Note 3, the large diameter portion may include the relay flow path (178) interposed between the first flow path and the communication flow path and extending from the inner side toward the outer side of the inner shaft in the diametrical direction of the inner shaft.

The outer circumferential surface of the large diameter portion is closer to the inner circumferential surface of the outer shaft than the outer circumferential surfaces of the first small diameter portion and the second small diameter portion are. Therefore, the gap between the relay flow path and the communication flow path can be reduced. Therefore, the leakage of the coolant through the gap can be suppressed.

Supplementary Note 5

In the rotating electric machine according to Supplementary Note 4, the rotating shaft may include the first seal member (184) and the second seal member (186) that are interposed between the outer circumferential surface of the large diameter portion and the inner circumferential surface of the outer shaft, and the outlet of the relay flow path may be positioned between the first seal member and the second seal member in the axial direction of the rotating shaft.

Since the outlet of the relay flow path 178 is positioned between the first seal member and the second seal member, the coolant is prevented from leaking out into the space between the outer circumferential surface of the first small diameter portion and the inner circumferential surface of the outer shaft. Similarly, the coolant is also prevented from leaking out into the space between the outer circumferential surface of the second small diameter portion and the inner circumferential surface of the outer shaft.

Supplementary Note 6

In the rotating electric machine according to any one of Supplementary Notes 3 to 5, the first flow path may be the space extending linearly in the axial direction and toward the large diameter portion, in the interior of the first small diameter portion.

Since the first flow path is linear, the first flow path can be easily formed in the inner shaft.

Supplementary Note 7

In the rotating electric machine according to any one of Supplementary Notes 3 to 6, the rotating shaft further may include the magnet holder (90) configured to cover the outer circumferential surface of the outer shaft and retain the permanent magnet, and the second flow path may be formed between the outer shaft and the magnet holder.

In this case, it is not necessary to form the coolant flow path inside the outer shaft. Accordingly, it is easy to form the second flow path in the outer shaft.

Supplementary Note 8

In the rotating electric machine according to Supplementary Note 7, the outer groove (188) may be formed in the outer circumferential surface of the outer shaft, and the second flow path may be formed by covering the outer groove with the magnet holder.

The outer groove is formed in the outer circumferential surface of the outer shaft, and the outer groove is covered with the magnet holder, whereby the second flow path can be formed. Accordingly, the second flow path can be easily formed.

Supplementary Note 9

In the rotating electric machine according to Supplementary Note 7 or 8, the coolant may be oil, and the coolant that has flowed through the second flow path may be supplied to the bearing (94) configured to rotatably support the rotating shaft in the housing (14).

Since the coolant also serves as the lubricating oil for the bearing, the coolant and the lubricating oil can be supplied to the first flow path from the same oil supply device. That is, it is not necessary to separately install the coolant supply device and the lubricating oil supply device. Therefore, the configuration of the rotating electric machine system including the rotating electric machine can be simplified.

Supplementary Note 10

In the rotating electric machine according to any one of Supplementary Notes 1 to 9, the second flow path may include the outbound path (175*a*) extending from the first end part (42*a*), which is one end part of the outer shaft, toward the second end part (42*b*), which is the other end part of the outer shaft, and the inbound path (175*b*) communicating with the outbound path and extending from the second end part toward the first end part of the outer shaft.

According to this configuration, a supply unit for supplying the coolant from the first flow path to the outbound path and a recovery unit for recovering the coolant that has flowed through the inbound path, can be provided at the first end of the rotating shaft in a concentrated manner.

Supplementary Note 11

In the rotating electric machine according to Supplementary Note 3, the rotating shaft may include the tubular body (191) retained by the outer shaft and surrounding the outer circumferential surface of the first small diameter portion, and the second flow path may include the outbound path (175*a*) extending from the first end part (42*a*), which is one end part of the outer shaft, toward the second end part (42*b*), which is the other end part of the outer shaft, the inbound path (175*b*) communicating with the outbound path and extending from the second end part toward the first end part of the outer shaft, the first discharge path (193*a*) extending from the inbound path toward the first small diameter portion, and the second discharge path (193*b*) formed between the tubular body and the outer shaft.

According to this structure, it is easy to discharge the coolant that has flowed through the inbound path to the outside of the rotating shaft.

Supplementary Note 12

In the rotating electric machine according to any one of Supplementary Notes 1 to 11, the inner shaft may include the extending portion (104) protruding in the axial direction of the outer shaft from one end of the outer shaft in the axial direction.

In this case, the coolant can be easily supplied to the first flow path formed in the extending portion. Therefore, the outer shaft, the permanent magnet, or the like is prevented from being contaminated by the coolant.

Supplementary Note 13

The rotating electric machine (13) includes the rotor (30) and the stator (32) surrounding the rotor, the rotor including the permanent magnet (88) and the rotating shaft (40). The rotating shaft includes the coolant flow path (170) through which the coolant flows. The coolant flow path includes the first flow path (172), a second flow path (174C), and a communication flow path (176). The first flow path extends from one end part toward the other end part of the rotating shaft, along the axial direction of the rotating shaft. The second flow path communicates with the terminal end of the first flow path in the flow direction in which the coolant flows, and extends toward the other end part of the rotating shaft on the outer circumferential side of the first flow path. The communication flow path extends from the inner side toward the outer side of the rotating shaft in the diametrical direction of the rotating shaft and places the terminal end of the first flow path and the second flow path in communication with each other.

The permanent magnet can be efficiently cooled by the coolant flowing through the interior of the rotating shaft. Further, since the coolant flows in the interior of the rotating shaft, any concern that foreign substance may be mixed into the coolant from the outside of the rotating shaft can be dispensed with.

Supplementary Note 14

In the rotating electric machine according to Supplementary Note 13, the coolant may be oil, and the coolant that has flowed through the second flow path may be supplied to the bearing (94) configured to rotatably support the rotating shaft in the housing (14).

Since the coolant also serves as the lubricating oil for the bearing, the coolant and the lubricating oil can be supplied to the first flow path 172 from the same oil supply device. That is, it is not necessary to separately install the coolant supply device and the lubricating oil supply device. Therefore, it is possible to simplify the incidental equipment of the rotating electric machine.

Moreover, it should be noted that the present invention is not limited to the embodiments described above, but a variety of configurations may be adopted therein without departing from the essence and gist of the present invention.

The invention claimed is:

1. A rotating electric machine comprising a rotor and a stator surrounding the rotor, the rotor including a permanent magnet and a rotating shaft, wherein the rotating shaft includes an outer shaft having a hollow tubular shape, an inner shaft configured to be inserted in an interior of the outer shaft, and a coolant flow path through which a coolant flows, the coolant flow path includes a first flow path formed in the inner shaft, a second flow path formed in the outer shaft, and a communication flow path configured to place the first flow path and the second flow path in communication with each other, the first flow path is disposed upstream in a flow direction in which the coolant flows, the second flow path is disposed downstream in the flow direction, and the communication flow path is positioned between the first flow path and the second flow path, the inner shaft includes a first small diameter portion and a second small diameter portion whose outer circumferential surfaces are not in contact with an inner circumferential surface of the outer shaft, and a large diameter portion positioned between the first small diameter portion and the second small diameter portion and having a diameter larger than a diameter of the first small diameter portion and a diameter of the second small diameter portion, the first small diameter portion being positioned at one end part of the inner shaft in an axial direction of the inner shaft, the first flow path is formed in an interior of the first small diameter portion, the second flow path is formed in an outer circumferential portion of the outer shaft, the communication flow path extends from an inner side toward an outer side of the outer shaft in a diametrical direction of the outer shaft, and the large diameter portion includes a relay flow path interposed between the first flow path and the communication flow path and extending from an inner side toward an outer side of the inner shaft in a diametrical direction of the inner shaft.

2. The rotating electric machine according to claim 1, wherein the rotating shaft includes a first seal member and a second seal member that are interposed between an outer circumferential surface of the large diameter portion and the inner circumferential surface of the outer shaft, and an outlet of the relay flow path is positioned between the first seal member and the second seal member in an axial direction of the rotating shaft.

3. The rotating electric machine according to claim 1, wherein the first flow path is a space extending linearly in the axial direction and toward the large diameter portion, in the interior of the first small diameter portion.

4. The rotating electric machine according to claim 1, wherein the rotating shaft further includes a magnet holder configured to cover an outer circumferential surface of the outer shaft and retain the permanent magnet, and the second flow path is formed between the outer shaft and the magnet holder.

5. The rotating electric machine according to claim 4, wherein an outer groove is formed in the outer circumferential surface of the outer shaft, and the second flow path is formed by covering the outer groove with the magnet holder.

6. The rotating electric machine according to claim 4, wherein the coolant is oil, and the coolant that has flowed through the second flow path is supplied to a bearing configured to rotatably support the rotating shaft in a housing.

7. The rotating electric machine according to claim 1, wherein the second flow path includes an outbound path extending from a first end part, which is one end part of the outer shaft, toward a second end part, which is another end part of the outer shaft, and an inbound path communicating with the outbound path and extending from the second end part toward the first end part of the outer shaft.

8. The rotating electric machine according to claim 1, wherein the inner shaft includes an extending portion protruding in an axial direction of the outer shaft from one end of the outer shaft in the axial direction.

9. A rotating electric machine comprising a rotor and a stator surrounding the rotor, the rotor including a permanent magnet and a rotating shaft, wherein the rotating shaft includes an outer shaft having a hollow tubular shape, an inner shaft configured to be inserted in an interior of the outer shaft, and a coolant flow path through which a coolant flows, the coolant flow path includes a first flow path formed in the inner shaft, a second flow path formed in the outer shaft, and a communication flow path configured to place the first flow path and the second flow path in communication with each other, the first flow path is disposed upstream in a flow direction in which the coolant flows, the second flow path is disposed downstream in the flow direction, and the communication flow path is positioned between the first flow path and the second flow path, the inner shaft includes a first small diameter portion and a second small diameter portion whose outer circumferential surfaces are not in contact with an inner circumferential surface of the outer shaft, and a large diameter portion positioned between the first small diameter portion and the second small diameter portion and having a diameter larger than a diameter of the first small diameter portion and a diameter of the second small diameter portion, the first small diameter portion being positioned at one end part of the inner shaft in an axial direction of the inner shaft, the first flow path is formed in an interior of the first small diameter portion, the second flow path is formed in an outer circumferential portion of the outer shaft, the communication flow path extends from an inner side toward an outer side of the outer shaft in a diametrical direction of the outer shaft, the rotating shaft includes a tubular body retained by the outer shaft and surrounding the outer circumferential surface of the first small diameter portion, and the second flow path includes an outbound path extending from a first end part, which is one end part of the outer shaft, toward a second end part, which is another end part of the outer shaft, an inbound path communicating with the outbound path and extending from the second end part toward the first end part of the outer shaft, a first discharge path extending from the inbound path toward the first small diameter portion, and a second discharge path formed between the tubular body and the outer shaft.

* * * * *